United States Patent [19]

Sado et al.

[11] 4,344,147
[45] Aug. 10, 1982

[54] ELECTRONIC CALCULATOR WITH PRINTER

[75] Inventors: Ichiro Sado, Tokyo; Mitsuo Cho, Ina; Juji Kishimoto, Tokyo; Masayuki Sasaki, Yokohama, all of Japan

[73] Assignee: Canon Kabushiki Kaisha, Tokyo, Japan

[21] Appl. No.: 87,706

[22] Filed: Oct. 24, 1979

[30] Foreign Application Priority Data

Nov. 10, 1978 [JP] Japan ................................ 53-138441
Nov. 14, 1978 [JP] Japan ................................ 53-140109

[51] Int. Cl.³ ........................ G06K 15/02; G06F 3/12
[52] U.S. Cl. ................................................ 364/710
[58] Field of Search .................... 364/710, 419; 35/6, 35/9 A, 31; 235/432

[56] References Cited

U.S. PATENT DOCUMENTS

| | | | |
|---|---|---|---|
| 3,787,988 | 1/1974 | Nakajima et al. | 35/6 |
| 3,974,575 | 8/1976 | Duncan | 35/31 R |
| 4,016,411 | 4/1977 | Genin | 364/710 |
| 4,044,228 | 8/1977 | Kishimoto et al. | 364/710 |
| 4,138,734 | 2/1979 | Nakata et al. | 364/710 |

Primary Examiner—Errol A. Krass
Attorney, Agent, or Firm—Fitzpatrick, Cella, Harper & Scinto

[57] ABSTRACT

An electronic calculator having a printer detects the key entry by one of arithmetic keys following the numerical key entry and prints one of arithmetic symbols and entered number respectively at the left-hand side and right-hand side of the print sheet.

2 Claims, 11 Drawing Figures

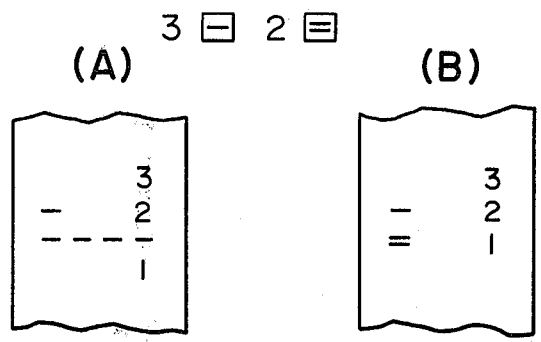
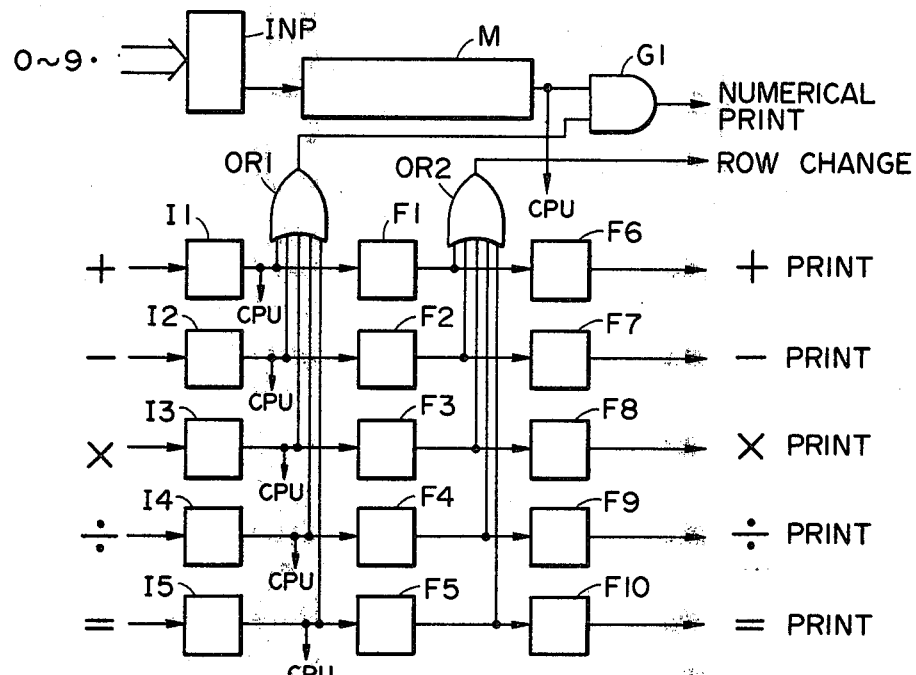
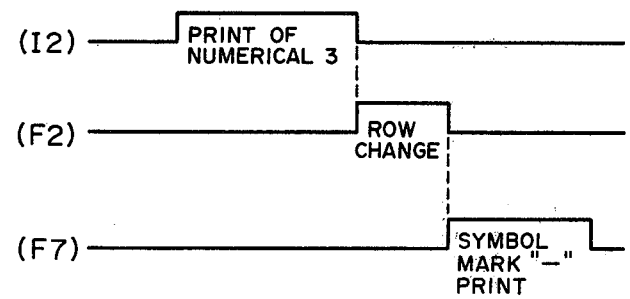
FIG. 1
FIG. 2
FIG. 3

KEY OPERATION  [3] [+] [2] [−] [1] [=]

EXAMPLE (1)

EXAMPLE (2)

(A)      (B) PRIOR ART 4,344,147

ELECTRONIC CALCULATOR WITH PRINTER

BACKGROUND OF THE INVENTION

1. Field of the Invention

The present invention relates to an electronic calculator, and more particularly to an electronic calculator capable of providing an easily understandable print with key operations following the order of ordinary arithmetic equations.

2. Description of the Prior Art

In the conventional calculators, the number and the arithmetic symbol are printed on a same row by the actuation of an instruction key following the numerical entry. However, for example in a calculation $3-2=1$ by the key operations in this order, a print "3 —" in the same row as shown in FIG. 4B appears like "minus 3", and is different from the method employed in the conventional adders or from the method taught in elementary education.

SUMMARY OF THE INVENTION

It is an object of the present invention to provide an electronic calculator with printer solving the foregoing drawbacks.

It is another object of the present invention to provide an electronic calculator with printer capable of providing an easily understandable print with key operations following the order of ordinary arithmetic equations.

The present invention will be made apparent from the following description taken in conjunction with the attached drawings.

BRIEF DESCRIPTION OF THE DRAWINGS

FIG. 1, including A & B, is views showing the example of key operation and print according to the present invention;

FIG. 2 is a block diagram of the calculator embodying the present invention;

FIG. 3 is a wave-form chart for explaining the function thereof;

DESCRIPTION OF THE PREFERRED EMBODIMENTS

FIG. 1 shows examples of print format in case of key operation for a calculation $3-2=1$, wherein (A) has the "—" symbols over all the digits to facilitate the observation of the calculation while (B) has an "=" symbol printed in the same row as the result of calculation.

In FIG. 2, showing an embodiment of the present invention in a block diagram, there are shown an input section INP composed of decoders, flip-flops etc. for converting input data by numeral keys and decimal point key into binary codes, a numerical input register M, operator key signal generating units I1, I2, I3, I4 and I5 for generating determined pulse signals respectively in response to the actuation of operator keys "+", "—", "×", "÷" and "=", a first delay circuit group F1, F2, F3, F4 and F5 for delaying the input signals for a period enough for the printing of the content of said input register M, a second delay circuit group F6, F7, F8, F9 and F10 for delaying the input signals for a period in excess of the time required for the row change of the printer, an OR gate OR1 for releasing a signal "1" in response to the output from any of said units I1–I5, an AND gate G1 for transmitting the content of said input register M to a numeral print circuit upon receipt of the output signal "1" from said gate OR1, and an OR gate OR2 for supplying a row change instruction to the printer in response to a signal "1" from any of the delay circuits F1–F5.

An unrepresented arithmetic processing unit supplies the result of calculation to the numeral print circuit in response to the output signal from the unit I5.

Figure 4:
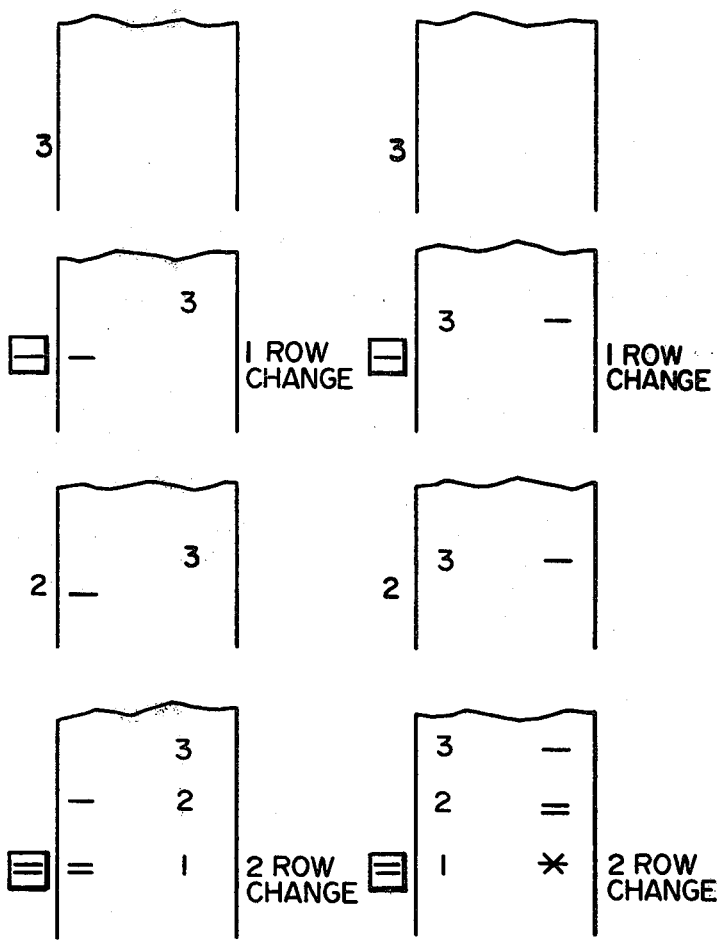
FIG. 4A is a view showing the order of printing in the present invention.
FIG. 4B is a view showing the order of printing in the prior art.

As will be apparent from FIGS. 2, 3 and 4A, the numeral "3" is at first printed by the function of I2, OR1 and G1 in response to the operator key entry "—" following the entry of numeral "3" into the input register M, and, after the row change by F2 and OR2, a print signal for the operator symbol "—" is given from the unit F7 to the printer drive circuit to print the symbol "—" at the left-hand side of the print sheet. Thereafter the numeral "2" is entered into the input register M, and upon actuation of the operator key "=", the numeral "2" is printed in the same row as the symbol "—" while the symbol "=" and the result "1" are printed in the succeeding row.

As explained in the foregoing, the present invention is easily achievable by adding a circuit as shown in FIG. 2 to the conventional display-calculating circuit and printer drive circuit. In comparison with the print format of the prior art shown in FIG. 4B, it will be apparent that the print format of the present invention allows easier understanding. The print format as shown in FIG. 1A can be obtained by printing the symbol "—" over the entire digits in response to the output of the unit I5, and then printing the result after the row change. The printing of the operator symbols at the left-hand side of the sheet can be achieved by changing the position of operator font on the print drum.

In the foregoing printer in which the symbol "—" is printed immediately in response to the actuation of the key "—", the print sheet as well as the print time will be wasted if said actuation is erroneous. It is therefore further preferable not to print the symbol "—" in immediate response to the key operation. Also in consideration of the printer structure and the drive circuit therefor, it is preferable to print each row at a time.

For this reason there is given in the following another embodiment of the present invention, wherein FIG. 5 giving an example for a calculation $3+2-1=4$.

Figure 6:
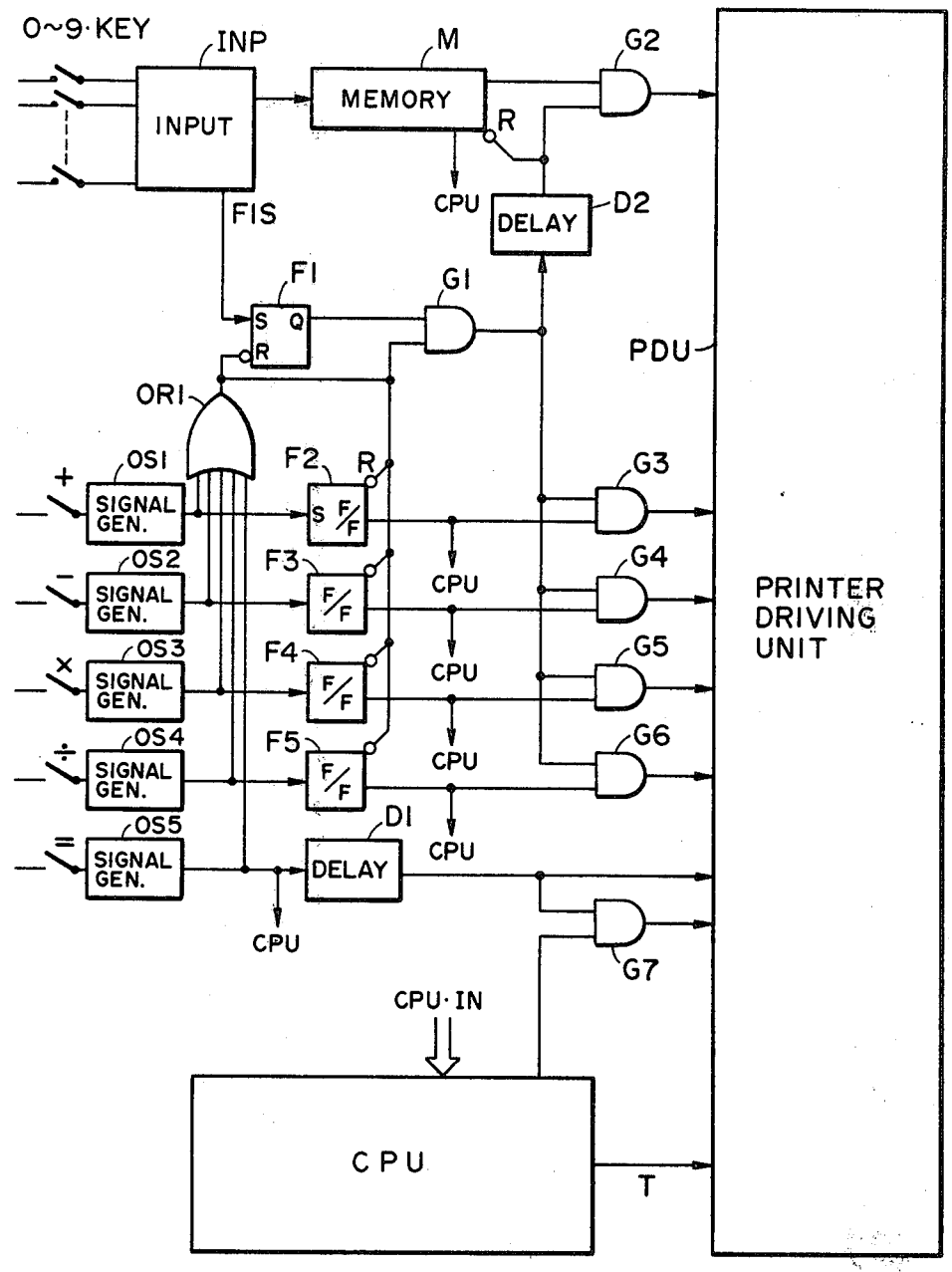
FIG. 6 is a block diagram of said embodiment.

FIG. 6 provides an example of the circuit for such embodiment, wherein there are shown a numerical key input section INP for performing a function of converting the numerical key entry into binary codes and storing the same in succession into a memory M and a function of transmitting a signal to a line FIS indicating the actuation of numeral keys, operator key signal generating circuits OS1, OS2, OS3, OS4 and OS5 for generating signals of one-bit width respectively in response to the actuation of keys "+", "−", "×", "÷" and "=" and in synchronization with the clock pulses, an OR gate OR1 for releasing a logic signal "1" in response to a logic signal "1" from any of said circuits OS1 to OS5, a flip-flop F1 to be set by the signal on the line FIS and to be reset by the output signal from the gate OR1, set-preferential delaying flip-flops F2, F3, F4 and F5 to be set respectively by the output signals from said circuits OS2 to OS5 and to be reset by the output signal from said gate OR1 and adapted to release the output signal delayed by one bit from the entry of said set or reset signal, an AND gate G1 receiving the output signals from F1 and OR1 to release a logic signal "1" in response to the first actuation of an operator key after the actuation of numeral keys, a delay circuit D2 for releasing a logic signal "1" in response to the output signal from the gate G1 and for a period enough for the output of the content of the memory M, a gate G2 for transmitting the content of said memory M in response to the output signal from said delay circuit D2, and an erase signal input terminal R of said memory M.

Furthermore there are shown AND gates G3, G4, G5 and G6 for transmitting the output signals from said flip-flops F2, F3, F4 and F5 in response to the output signal from the gate G1, wherein G3 releases a signal for instructing the printer drive unit PDU to print a symbol "+" while the gate G4 releases a signal for instructing the printing of a symbol "−".

A delay circuit D1 receiving the output signal of the circuit OS5 has a function of causing, in response to said signal, the arithmetic processing unit CPU to release the result of calculation, causing a delay for a period enough for printing the operator and the number entered before the actuation of the key "=", and finally causing the gate G7 to transmit the signals for the symbol "=" and for the result of calculation to the printer drive unit PDU.

CPU is the arithmetic processing unit for conducting arithmetic calculation upon receipt of key entries and releasing the result in response to the actuation of the key "=", and a signal line T from said unit CPU to the printer control unit PDU transmits the timing signals for controlling the printing and paper feeding.

Figure 7:
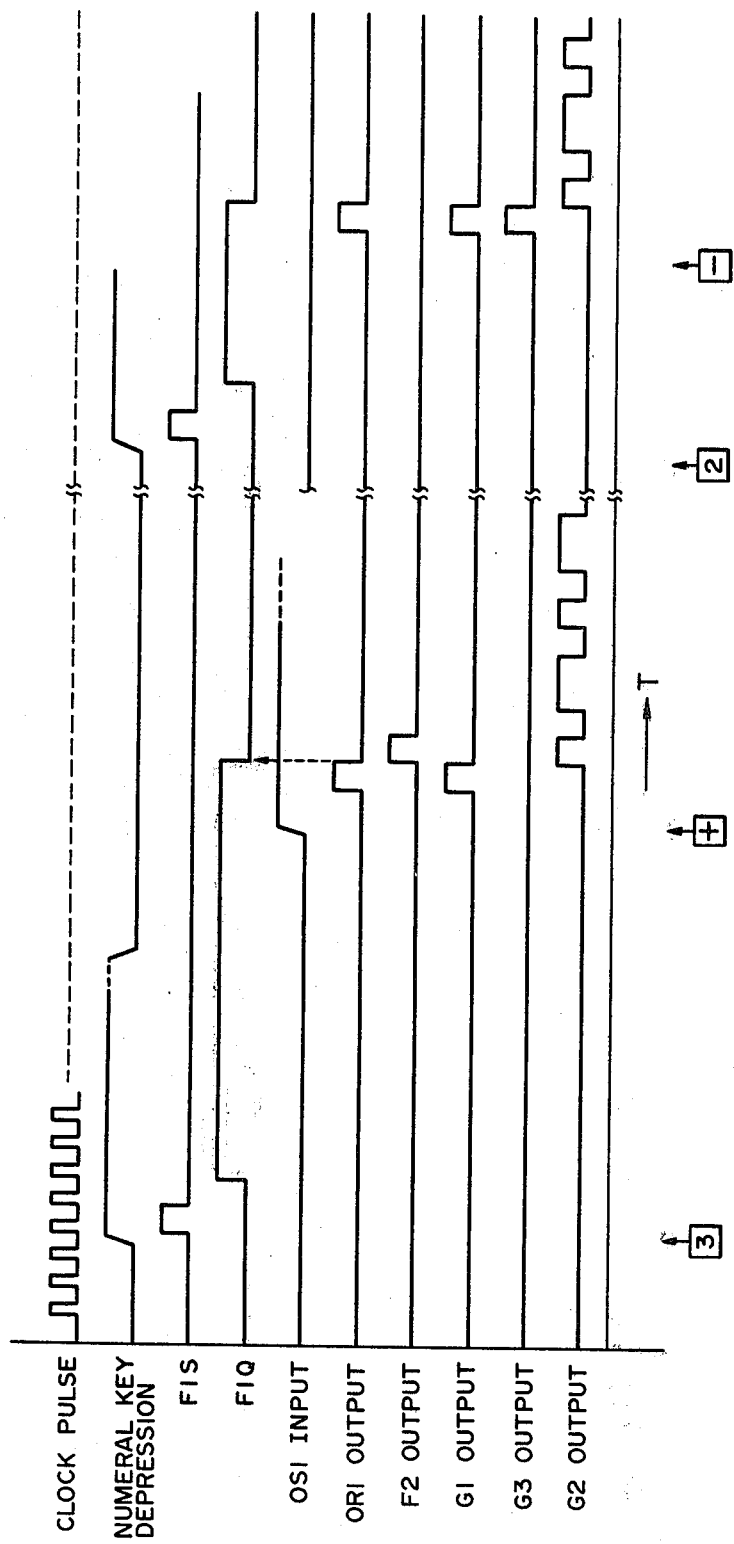
FIG. 7 is a wave-form chart for explaining the function thereof.

In the following the function of the circuit shown in FIG. 6 will be explained with respect to the example shown in FIG. 5, while making reference to the timing chart shown in FIG. 7 and the print order shown in FIG. 8A.

At first, in response to the actuation of a key "3", a numeral "3" is stored in the memory M and the flip-flop F1 is simultaneously set.

Upon subsequent actuation of the key "+", the key signal generating circuit OS1 supplies a signal to the gate OR1 while the flip-flop F1 releases a logic signal "1" at this moment before the resetting, whereby the AND gate G1 receives a one-bit logic signal "1" to transmit the content of memory M through the delay circuit D2 and AND gate G2 to the printer drive unit PDU thereby printing the numeral "3". The flip-flop F2 does not provide the output signal "1" when the AND gate G1 releases the output signal "1", so that the symbol "+" is not printed. Upon subsequent actuation of the key "−" following the entry of the numeral "2", the data "2" in the memory M and the output for the symbol "+" from the flip-flop F2 are supplied through the AND gate G3 to the printer drive unit PDU to perform the printing of "+2" in the same row. The flip-flop F2 is reset by the output from the gate OR1 to release a logic signal "0" after one bit while the flip-flop F3 releases the logic signal "1" at the same time.

Upon subsequent actuation of the key "=" after the entry of the numeral "1", the output signals from the gate OR1 and flip-flop F1, both being logic "1", print the numeral "1" through the gate G1 in the same row as the symbol "−" printed through the gate G4, and after a determined period the circuit D1 releases the output signal to cause the printing of symbol "=" and transmit the result of calculation "4" from the CPU to the printer drive unit PDU through the gate G7.

In this manner, after the actuation of the key "=", there are performed the printing of "−1" and subsequently the printing of "=4" after the row change. In this state the flip-flops F2–F5 are reset and do not affect the subsequent calculation.

In case the key "−" is mistaken for the key "×", obtained in response thereto is a print "+2". Upon subsequent actuation of the key "−" for correction, there is obtained no print in this state since the F1 is already reset to provide no change to the output of the gate G1, but the flip-flops F4 and F3 are reset in this state. In this manner it is possible to correct the key operation.

Figure 5:
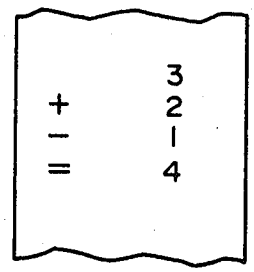
FIG. 5 is views showing the example of key operation and print in another embodiment of the present invention.
Figure 5:
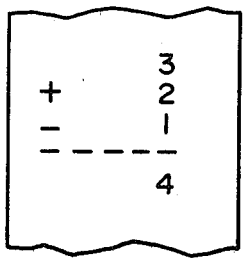

FIG. 5(2) shows another example of print format in which the symbol "=" is replaced by an underline.

Figure 8:
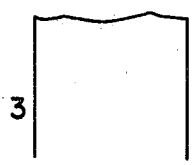
FIG. 8A is a view showing the order of printing in another embodiment of the present invention.
FIG. 8B is a view showing the order of printing in the prior art.
Figure 8:
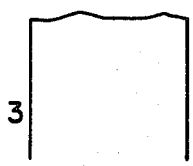
Figure 8:
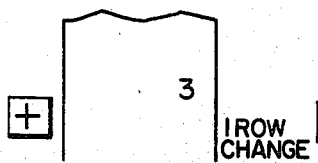
Figure 8:
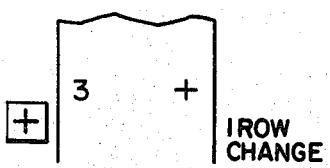
Figure 8:
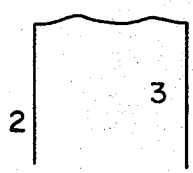
Figure 8:
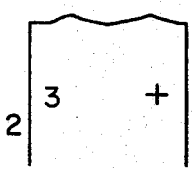
Figure 8:
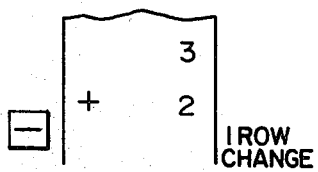
Figure 8:
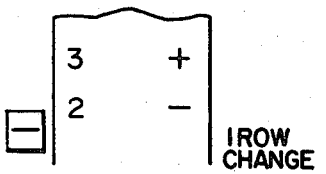
Figure 8:
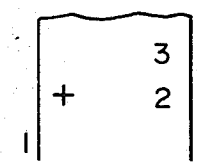
Figure 8:
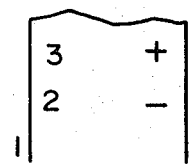
Figure 8:
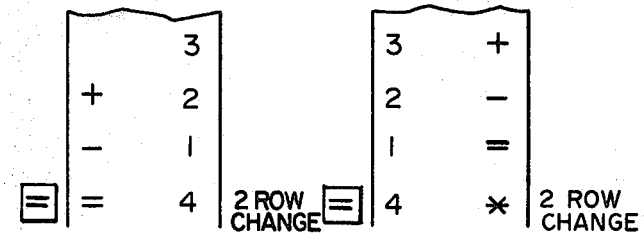

FIG. 8(B) shows an example of print format of the prior art.

As explained in the foregoing, the present invention allows to provide an electronic calculator with printer capable of giving an easily understandable print format through key operations in the order of ordinary mathematical equations, by means of adding a simple printer drive circuit.

What we claim is:

1. An electronic calculator for calculating a result from numerical data operated on thereby and having a printer for printing information about the calculation on a print sheet; said calculator comprising:

an input section having numerical keys for entering numerical data, arithmetic operator keys and an equals (=) key;

means for shifting the print sheet relative to the printer to print on succeeding rows; and a control section including means for storing numerical data entered by said numerical keys;

means, responsive to actuation of any one of said operator keys, for operating the printer to print the first numerical data, entered into said storing means immediately prior to actuation of said one operator key, on the right-hand side of one row of the print sheet;

first delay means for operating said shifting means, after the first numerical data has been printed, to shift the print sheet relative to the printer to print on the row next succeeding said one row;

second delay means for operating the printer, only after the print sheet has been shifted relative to the printer, to print the symbol of said one of said operator keys on the left-hand side of the next succeeding row of the print sheet;

means, responsive to actuation of said equals (=) key, for operating the printer to print the last numerical data, entered into said storing means immediately prior to actuation of said equals (=) key, on the right-hand side of the print sheet of the last row on which the symbol of an operator key has been printed;

third delay means for operating said shifting means after the last numerical data has been printed to shift the print sheet relative to the printer to print on the row succeeding the last row; and fourth delay means for operating the printer, only after the print sheet has been shifted relative to the printer, to print the symbol (=) and the result of the calculation respectively on the left-hand and right-hand sides of the row of the print sheet succeeding the last row.

2. An electronic calculator for calculating a result from numerical data operated on thereby and having a printer for printing information about the calculation on a print sheet; said calculator comprising:

an input section having numerical keys for entering numberical data, arithmetic operator keys, and an equals (=) key; and means for shifting the print sheet relative to the printer to print on succeeding rows;

a control section including means for storing numerical data entered by said numerical keys;

means, responsive to the first actuation of any one of said operator keys during any one calculation, for operating the printer to print the first numerical data entered in said storing means immediately prior to the first actuation on the right-hand side of one row of the print sheet;

first delay means for operating said shifting means after printing of the first numerical data to shift the print sheet relative to the printer to print on a row succeeding the one row;

means, responsive to each subsequent actuation of any of said operator keys during the one calculation, for operating the printer to print subsequent numerical data, entered in said storing means immediately prior to the subsequent actuation, on the right-hand side of the succeeding row of the print sheet to which it has been shifted relative to the printer, and to print the symbol of said operator key actuated immediately prior to entry of the subsequent numerical data on the left-hand side of the succeeding row of the print sheet;

second delay means for operating said shifting means to shift the print sheet relative to the printer to print on the row next succeeding the succeeding row, after the subsequent numerical data and the symbol of said operator key actuated immediately prior to entry of the subsequent numerical data have been printed;

means, responsive to actuation said equals (=) key, for operating the printer to print the last numerical data, entered in said storing means immediately prior to actuation of said equals (=) key, on the right-hand side of the last row to which the print sheet has been shifted relative to the printer and to print the symbol of said operator key actuated immediately prior to entry of the last numerical data on the left-hand side of the last row;

third delay means for shifting the print sheet relative to the printer, after the last numerical data and the symbol of said operator key actuated immediately prior to entry of the last numerical data have been printed, to print on the row succeeding the last row; and fourth delay means for operating the printer only after the print sheet has been shifted relative to the printer, to print the symbol (=) and the result of the calculation respectively on the left-hand side and the right-hand side on the row succeeding the last row of the print sheet.

* * * * *